United States Patent
Mazzola et al.

(10) Patent No.: US 10,357,940 B2
(45) Date of Patent: *Jul. 23, 2019

(54) MULTILAYER METALLIZED CAST FILM AND PACKAGING MADE THEREFROM

(71) Applicant: Dow Global Technologies LLC, Midland, MI (US)

(72) Inventors: Nicolas C. Mazzola, Jundiai (BR); Jorge Caminero Gomes, San Paulo (BR); Angels Domenech, San Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/500,551

(22) PCT Filed: Jul. 30, 2015

(86) PCT No.: PCT/US2015/042775
§ 371 (c)(1),
(2) Date: Jan. 31, 2017

(87) PCT Pub. No.: WO2016/022365
PCT Pub. Date: Feb. 11, 2016

(65) Prior Publication Data
US 2017/0232706 A1    Aug. 17, 2017

Related U.S. Application Data

(63) Continuation-in-part of application No. 14/454,060, filed on Aug. 7, 2014.

(51) Int. Cl.
| | |
|---|---|
| *B32B 7/02* | (2019.01) |
| *B32B 27/08* | (2006.01) |
| *B32B 27/32* | (2006.01) |
| *B65D 65/40* | (2006.01) |

(52) U.S. Cl.
CPC ............. *B32B 7/02* (2013.01); *B32B 27/08* (2013.01); *B32B 27/32* (2013.01); *B32B 27/327* (2013.01); *B65D 65/40* (2013.01); *B32B 2255/10* (2013.01); *B32B 2255/205* (2013.01); *B32B 2307/308* (2013.01); *B32B 2307/406* (2013.01); *B32B 2307/412* (2013.01); *B32B 2307/72* (2013.01); *B32B 2439/00* (2013.01)

(58) Field of Classification Search
CPC .......... B32B 2255/10; B32B 2255/205; B32B 2307/72; B32B 2439/00; B32B 27/08; B32B 27/327; B32B 7/02; B65D 65/40
See application file for complete search history.

(56) References Cited

U.S. PATENT DOCUMENTS

| | | |
|---|---|---|
| 3,645,992 A | 2/1972 | Elston |
| 3,914,342 A | 10/1975 | Mitchell |
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa et al. |
| 5,854,045 A | 12/1998 | Fang et al. |
| 5,885,721 A | 3/1999 | Su et al. |
| 5,916,692 A | 6/1999 | Brambilla |
| 6,689,857 B1 | 2/2004 | Larter et al. |
| 6,903,162 B2 | 6/2005 | Nygard et al. |
| 7,601,409 B2 | 10/2009 | Ohlsson |
| 2002/0192466 A1 | 12/2002 | Lu et al. |
| 2003/0211350 A1 | 11/2003 | Migliorini et al. |
| 2004/0072004 A1 | 4/2004 | Migliorini et al. |
| 2004/0181024 A1 | 9/2004 | Nakamura et al. |
| 2005/0003175 A1 | 1/2005 | Nygard et al. |
| 2005/0175803 A1 | 8/2005 | Breese |
| 2006/0222796 A1 | 10/2006 | Morris |
| 2007/0292705 A1 | 12/2007 | Moncla et al. |
| 2008/0070050 A1 | 3/2008 | Urbain et al. |
| 2009/0098357 A1 | 4/2009 | Bergtold et al. |
| 2011/0236703 A1 | 9/2011 | McGee |
| 2012/0196061 A1 | 8/2012 | Weisinger |

FOREIGN PATENT DOCUMENTS

| | | |
|---|---|---|
| EP | 0055719 | 1/1985 |
| JP | H11342574 | 12/1999 |
| JP | 2007334858 | 12/2007 |
| WO | 2009110887 | 9/2009 |
| WO | 2010047891 | 4/2010 |
| WO | 2010147703 | 12/2010 |

OTHER PUBLICATIONS

International Search Report and Written Opinion for related PCT Application PCT/US2015/042775, dated Oct. 8, 2015 (9 pgs).
International Preliminary Report on Patentability for related PCT Application PCT/US2015/042775, dated Feb. 16, 2017 (7 pgs).
Peacock, et al., "Polymer Chemistry: Properties and Applications"; Hanser Publishers (2006).

*Primary Examiner* — Lawrence D Ferguson
(74) *Attorney, Agent, or Firm* — Brooks, Cameron & Huebsch, PLLC

(57) ABSTRACT

A multilayer metallized cast film which includes a first layer which comprises an ethylene-based polymer having a density greater than 0.94 g/cc and a melt index less than or equal to 1.3 g/10 min; and a second layer having an interior surface and an exterior surface and which comprises an ethylene-based polymer having a density greater than 0.94 g/cc and a melt index greater than or equal to 2.0 g/10 min, wherein the exterior surface of the second layer faces away from the first layer, wherein the second layer further comprises a metal and/or metal oxide layer deposited on the exterior surface is provided. Also provided is a packaging comprising the multilayer metallized cast film.

15 Claims, No Drawings

MULTILAYER METALLIZED CAST FILM AND PACKAGING MADE THEREFROM

FIELD OF THE INVENTION

This invention relates to multilayer metallized cast film and packaging made therefrom.

BACKGROUND

Laminated films are widely used for packaging applications. The choice of substrate depends, at least in part, on the functional requirements (e.g., thermal stability, barrier, abuse resistance, and/or sealing) for the end use. Alternatively, package aesthetics (e.g., high gloss, transparency, and/or decorative printing) may impact the choice of substrate. A significant part of the packaging market uses glossy films as external layers for laminated packages in order to increase impact on the consumer. For several applications, the use of metalized films is also used due to both the appearance and barrier properties offered by such films.

Typical metalized substrates include polypropylene (PP), biaxially oriented polypropylene (BOPP), and polyethylene terephthalate (PET). Polyethylene-based films generally are not used as substrates for metallized films due to their poor metal adhesion and bond strength. Rather, polyethylene-based layers or films are generally used as internal substrates and require the addition of migratory slip agents to reduce the coefficient of friction. The addition of migratory slip is known to reduce even further the adhesion of metal on the polyethylene-based film or layer surface.

SUMMARY

In a first embodiment, the invention provides a multilayer metallized cast film comprising a first layer which comprises an ethylene-based polymer having a density greater than 0.94 g/cc and a melt index less than or equal to 1.3 g/10 min; and a second layer having an interior surface and an exterior surface and which comprises an ethylene-based polymer having a density greater than 0.94 g/cc and a melt index greater than or equal to 2.0 g/10 min, wherein the exterior surface of the second layer faces away from the first layer, wherein the second layer further comprises a metal and/or metal oxide layer deposited on the exterior surface. A third layer might also be added to provide sealing performance and comprises an ethylene-based polymer having a density lower than 0.94 g/cc and a melt index greater than or equal to 2.0 g/10 min.

DETAILED DESCRIPTION

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cc.

The term "LLDPE", includes both resin made using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The Linear PE can be made via gas-phase, solution-phase or slurry polymerization or any combination thereof, using any type of reactor or reactor configuration known in the art, with gas and solution phase reactors being most preferred.

The term "HDPE" refers to polyethylenes having densities greater than about 0.940 g/cc, which are generally prepared with Ziegler-Natta catalysts, chrome catalysts or even metallocene catalysts.

The following analytical methods are used in the present invention:

Density is determined in accordance with ASTM D792.

"Melt index" also referred to as I2" is determined according to ASTM D1238 (190° C., 2.16 kg).

2% Secant Modulus is determined according to ASTM D882.

Elmendorf Tear is determined according to ASTM D-1922.

Gloss is determined at a 45° angle according to ASTM D-2457.

Haze of the resulting film refers to the total haze (that is internal haze plus external haze) and is determined according to ASTM D1003.

Clarity is determined according to ASTM D1746.

Coefficient of friction (COF) is measured according to ASTM D-1894.

Lamination bond is measured according to ASTM F904.

Films

The present invention provides a multilayer metallized cast film comprising:

a. a first layer which comprises an ethylene-based polymer having a density greater than 0.94 g/cc and a melt index less than or equal to 1.3 g/10 min;

b. a second layer having an interior surface and an exterior surface and which comprises an ethylene-based polymer having a density greater than 0.94 g/cc and a melt index greater than or equal to 2.0 g/10 min, wherein the exterior surface of the second layer faces away from the first layer, wherein the second layer further comprises a metal and/or metal oxide layer deposited on the exterior surface.

In a particular embodiment, the film will further comprise a third layer which comprises an ethylene-based polymer having a melt index greater than or equal to 2 g/10 min and a density less than 0.94 g/cc, wherein the third layer is a second external layer of the film. The ethylene-based polymer may be, but need not be, the same polymer in each of the second and third layers.

The first layer (which is an inner or core layer when there are at least two external or exterior layers) will generally constitute from 30 to 80 percent by weight of the film, more preferably from 40 to 70 percent by weight of the cast film. The second layer will generally constitute from 20 to 70 percent by weight of the cast film more preferably from 30 to 60 percent by weight of the cast film. It is generally preferred that the third layer, when present be approximately the same thickness as the second layer, and hence when present it is generally preferred that the third layer and second layer each comprise from 5 to 40 percent by weight of the cast film more preferably from 10 to 30 percent by weight of the cast film. It is also contemplated that the cast film may comprise additional layers. These layers may be selected to provide additional functionality; for example, barrier properties may be improved with a barrier layer which comprises ethylene vinyl alcohol (EVOH), polyamide (PA) or polyvinylidene chloride (PVDC).

The first layer of the films of the present invention will comprise a High Density Polyethylene polymer (HDPE). HDPE materials are well known in the art, and in general refer to linear polyethylene materials having a density of at least 0.94 g/cc. Any type of HDPE can be used in the present invention. This includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The HDPE can be made via gas-phase, solution-phase or slurry polymerization or any combination thereof, using any type of reactor or reactor configuration known in the art, with gas and slurry phase reactors being most preferred. Preferred HDPE resins are sold by The Dow Chemical Company under the trade name DOWLEX™ 2050B and ELITE™ 5960G for example.

The HDPE component for use in the first layer (an internal layer in a structure with at least 3 layers) has a density of at least 0.940 g/cc. All individual values and subranges from at least 0.940 g/cc are included and disclosed herein. For example, the lower limit of the HDPE density can be 0.940, 0.942, 0.95 or 0.955 g/cc. In a particular embodiment, the HDPE has a density equal to or less than 0.969 g/cc All individual values and subranges from equal to or less than 0.969 g/cc are included and disclosed herein; for example, the upper limit of the HDPE density can be 0.969, 0.958, 0.949 g/cc. The HDPE component for use in the first layer also has a melt index, $I_2$, less than or equal to 1.3 g/10 min. All individual values and subranges from less than or equal to 1.3 g/10 min are included and disclosed herein. For example, the HDPE $I_2$ can be less than 1.3, 1.2, 1.1 or 1.0 g/10 min. In a particular embodiment, the HDPE $I_2$ is greater than or equal to 0.01 g/10 min. All individual values and subranges greater than or equal to 0.01 g/10 min are included and disclosed herein. For example, the HDPE $I_2$ lower limit can be 0.01, 0.05, 0.1, 0.5, or 1 g/10 min.

The first layer preferably contains from about 50 to 100% of one or more HDPE meeting the density and melt index limitations, but may also contain other materials. Thus the total composition for use in the first layer may advantageously comprise from 75 to 98% HDPE or from 85 to 90% HDPE. One polymer which may advantageously be added to the core layer in a minor amount is a high pressure low density type resin known in the industry as Low Density Polyethylene or LDPE. LDPE having a density in the range of 0.917 to 0.935 g/cc, preferably 0.920 to 0.929 g/cc are preferred. It is also preferred that the LDPE have a melt index of from 0.1 to 5.0 g/10 min, more preferably from 0.3 to 2.0 g/10 min. While the first layer of the present invention may contain as much as 50 percent by weight LDPE, it is preferred that the first layer comprise from 2-20 percent LDPE, more preferably from 5 to 15% LDPE.

In a particular embodiment, the first layer may contain less than 50 wt % HDPE having an $I_2$ greater than or equal to 1.3 g/10 min. All individual values and subranges less than 50 wt % are included and disclosed herein. For example, the amount of HDPE having an $I_2$ greater than or equal to 1.3 g/10 min in the first layer can be less than 50 wt %, or in the alternative, less than 45 wt %, or in the alternative, less than 40 wt %, or in the alternative, less than 35 wt %.

In another embodiment, the first layer may contain less than 50 wt % of an LDPE. All individual values and subranges less than 50 wt % are included and disclosed herein. For example, the amount of LDPE in the first layer can be less than 50 wt %, or in the alternative, less than 45 wt %, or in the alternative, less than 40 wt %, or in the alternative, less than 35 wt %.

The second layer has an interior surface and an exterior surface wherein the exterior surface of the second layer faces away from the first layer, wherein the second layer further comprises a metal and/or metal oxide layer deposited on the exterior surface. The second layer comprises a polyethylene having a density greater than 0.94 g/cc and a melt index greater than or equal to 2.0 g/10 min. When present, the third layer also comprises a polyethylene having a density lower than 0.94 g/cc and a melt index greater than or equal to 2.0 g/10 min.

All individual values and subranges of the density (for the polyethylene of the second and third layers independently) greater than 0.94 g/cm³ (g/cc) are included and disclosed herein; for example, the density can range from a lower limit of 0.94, 0.945, 0.95, 0.955, or 0.96 g/cc. In a particular embodiment, the density (for the polyethylene of the second and third layers independently) has an upper limit of 0.98, 0.97, or 0.96 g/cc. All individual values and subranges of the melt index ($I_2$) (for the polyethylene of the second and third layers independently) greater than or equal to 2.0 g/10 min are included and disclosed herein; for example, the melt index may range from a lower limit of 2.0, 5, 10, 50, or 100 g/10 min. In a particular embodiment, the melt index (for the polyethylene of the second and third layers independently) has an upper limit of 1,000; 500; 100; or 50 g/10 min.

In a particular embodiment, the film comprises a third layer which is a second external layer. When a third layer is present, the second and third layers are external layers and the first layer is a core layer.

In a particular embodiment, the exterior surface of the second layer is surface treated and has a surface energy in the range of at least 38 dynes/cm. All individual values and subranges from a lower limit of 38 dynes/cm are included and disclosed herein; for example, the surface energy of the external surface of the second layer can be from a lower limit of 38, 40, 43 or 45 dynes/cm. In a particular embodiment, the surface energy of the external surface of the second layer can have an upper limit of 46, 44, or 42 dynes/cm. For example, the surface energy of the external surface of the second layer can be from 38 to 46 dynes/cm, or in the alternative, from 43 to 44 dynes/cm, or in the alternative, from 42 to 46 dynes/cm, or in the alternative, from 38 to 44 dynes/cm, or in the alternative, from 42 to 44 dynes/cm. Surface treatments include for example, corona and/or plasma treatment and other conventional surface treatments to increase surface energy.

In yet another embodiment, the second layer has an optical density from 0.1 to 3. All individual values and subranges from 0.1 to 3 are included and disclosed herein; for example, the optical density can range from a lower limit of 0.1, 0.5, 1, 1.5, 2 or 2.5 to an upper limit of 0.2, 0.7, 1.3, 1.8, 2.2, 2.7, or 3. For example, the optical density can be from 0.1 to 3, or in the alternative, from 1.2 to 3, or in the alternative, from 0.1 to 1.7, or in the alternative, from 1 to 2.

Metallization processes include several version such as vacuum metallization, arc and flame spraying, electroplating, etc. The most representative process for packaging proposes is the vacuum metallization, according to the description found at Bobst Group website "Vacuum coating and metallizing is the process of adding a thin film of aluminum or other coating to a material. In principle, the process calls for the evaporation of the coating material inside a vacuum chamber, after which it condenses onto a web of substrate as it passes through. Paper and film metallizing is utilized in the packaging and decorative market segments. The barrier and decorative markets are noted for their wide variety of products from beer labels to chip bags" available at http://www.bobst.com/usen/products/vacuum-coating-metallizing/process/

Metals typically used for barrier or aesthetic purposes in packaging are typically used, including for example, aluminum.

In a particular embodiment, the multilayer metallized cast film has an optical density of equal to or greater than 1.5 and exhibits an improved barrier property in comparison to a comparative film having the same structure and composition except that the second layer of the comparative film is not metallized.

Improved barrier property could be gas, e.g. oxygen or CO2, or water vapor, or flavor or scent barrier.

In another embodiment the second layer further comprises at least one migratory and/or non-migratory slip additive in an amount of equal to or less than 5000 ppm based on the weight of the ethylene-based polymer in the second layer. All individual values and subranges from equal to or less than 5000 ppm are included and disclosed herein; for example, the amount of slip agent can be from an upper limit of 5000, 2500, 1000, or 500 ppm. Additives such as processing aids or polyethylene glycol can be added to the film as well to improve COF performance.

In a particular embodiment, the second and/or third layers (i,e., the external layers) have a coefficient of friction (COF) less than 0.3. All individual values and subranges from less than 0.3 are included and disclosed herein. For example, the COF can be less than 0.3, or in the alternative, less than 0.2, or in the alternative, less than 0.1.

In a particular embodiment, the multi-layer film has a total thickness of less than or equal to 100 microns. All individual values and subranges from an upper limit of 100 microns are included and disclosed herein; for example, the film thickness can have an upper limit of 80, 70, 60, 50, 40 or 30 microns. In a particular embodiment, the total film thickness has a lower limit of 40, 30, 20, or 10 microns.

In one embodiment, the multilayer metallized cast film has a 2% MD modulus of greater than 400 MPa. All individual values and subranges greater than 400 MPa are included and disclosed herein; for example, the 2% MD modulus of the film can be from a lower limit of 400, 450, or 500 MPa. In a particular embodiment, the 2% MD modulus has an upper limit of 1000, 900, 800, 700 or 500 MPa.

In another embodiment, the multilayer metallized cast film has an MD tear strength of less than 30 grams. All individual values and subranges from less than 30 grams are included and disclosed herein; for example, the MD tear strength can have an upper limit of 30, 28, 26, or 24 grams. In a particular embodiment, the MD tear strength has a lower limit of 10, 12, 14, 16, 20 or 22 grams.

In yet another embodiment, the multi-layer film is laminated onto a substrate. Acceptable substrates include polymers, paper, cardboard, cardstock, woven and nonwoven fabrics.

In a particular embodiment, the films of the present invention can be made by conventional extrusion film methods as is generally known in the art. While not necessary for practice of the present invention, it is possible to subject the films to post-extrusion mono- or biaxial orientation. In some embodiments the films of the present invention may be advantageously stretched at least 50%, preferably at least 100% in the machine and/or cross directions.

As is generally known in the art, each of the layers may include additives, such as pigments, inorganic fillers, UV stabilizers, antioxidants, and slip or antiblock additives.

The invention further provides packaging comprising the multilayer film. Such packaging may be used for liquids, solids, or particulates and include, for example, flexible packaging types such as pouches and monolithic pouches.

EXAMPLES

Films were produced using 3 different grades of HDPE; Resins 1, 2, and 3, as described in Table 1.

TABLE 1

|  | $I_2$ (g/10 min) | $I_{10}/I_2$ | Density (g/cc) | Mn | Mw | Mz | Mw/Mn |
|---|---|---|---|---|---|---|---|
| Resin 1 | 4.01 | 7.4 | 0.9425 | 26,114 | 83,443 | 236,493 | 3.2 |
| Resin 2 | 0.90 | 10.0 | 0.9636 | 17,131 | 101,814 | 290,933 | 5.9 |
| Resin 3 | 1.05 | 7.8 | 0.9536 | 33,399 | 120,247 | 349,281 | 3.6 |

Table 2 provides the structures of the Comparative and Inventive Films, wherein each "A" layer is an external layer corresponding to the second and third layers and the "B" layer corresponds to the first, core, layer. The "B" layer contributes 50% of the total film thickness and each "A" layer contributes 25% of the total film thickness.

TABLE 2

|  | Film Structures | | | Total Thickness |
|---|---|---|---|---|
|  | A (25%) | B (50%) | A (25%) | (µm) |
| Comp. Ex. 1a | 100% Resin 1 | 100% Resin 1 | 100% Resin 1 | 12 |
| Comp. Ex. 1b |  |  |  | 17 |

TABLE 2-continued

| | Film Structures | | | Total Thickness (μm) |
|---|---|---|---|---|
| | A (25%) | B (50%) | A (25%) | |
| Comp. Ex. 1c | | | | 23 |
| Comp. Ex. 2 | 100% Resin 3 | 100% Resin 3 | 100% Resin 3 | 23 |
| Inv. Ex. 1a | 100% Resin 1 | 100% Resin 2 | 100% Resin 1 | 17 |
| Inv. Ex. 1b | | | | 23 |
| Inv. Ex. 2a | 100% Resin 1 | 100% Resin 3 | 100% Resin 1 | 12 |
| Inv. Ex. 2b | | | | 17 |
| Inv. Ex. 2c | | | | 23 |

A Collin cast film line was used to produce the films and fabrication conditions are described in Table 3. Experimental parameters were adjusted to provide fast cooling and drawing in order to freeze all flow orientation. Chill temperature was maintained stable using cooled water feeding.

TABLE 3

| Film Thickness (μm) | Die gap (mm) | Set Tm (° C.) | Output (kg/h) | Chill Temp (° C.) | Winding Speed (m/min) |
|---|---|---|---|---|---|
| 12 | 0.7 | 235 | 6 | 16 | 29.0 |
| 17 | 0.7 | 235 | 6 | 16 | 23.0 |
| 23 | 0.7 | 235 | 6 | 16 | 16.0 |

Films properties of all 17 samples are presented in Table 4. Inventive examples demonstrate that films with high modulus could be obtained by using HDPE resins (density >0.940 g/cc) with high molecular weight ($I_2$<1.3 g/10 min; Mw>100 000; Mz>290 000). Better optical properties are observed when the external layers are made from lower molecular weight ($I_2$>2.0 g/10 min; Mw<100 000) polyethylene.

TABLE 4

| | Thickness (μm) | Haze | Gloss 45° | Clarity | Tear MD (g) | Sec. Mod. 2% MD (MPa) | Sec. Mod. 2% CD (MPa) |
|---|---|---|---|---|---|---|---|
| Comp. Ex. 1a | 13 | 3.42 | 72.4 | 99.6 | 19.2 | 454 | 474 |
| Comp. Ex. 1b | 18 | 4.39 | 64.8 | 99.7 | 22.6 | 343 | 597 |
| Comp. Ex. 1c | 23 | 5.42 | 68.1 | 99.6 | 28.1 | 481 | 489 |
| Comp. Ex. 2 | 23 | 7.33 | 65.6 | 99.3 | 32 | 705 | 895 |
| Inv. Ex. 1a | 18 | 6.86 | 72.5 | 98.7 | 30 | 524 | 691 |
| Inv. Ex. 1b | 24 | 8.03 | 71.4 | 98.8 | 22.3 | 545 | 646 |
| Inv. Ex. 2a | 14 | 3.15 | 74.4 | 99.5 | 9.6 | 572 | 700 |
| Inv. Ex. 2b | 18 | 3.96 | 75.6 | 99.4 | 13.6 | 493 | 587 |
| Inv. Ex. 2c | 23 | 4.89 | 70.6 | 99.6 | 21.6 | 480 | 579 |

Lamination Properties:

Inventive Example 1, after the addition of 2500 ppm of antiblock additive (silica) and 1000ppm of slip agent (erucamide), having a film thickness of 23 microns, was corona treated till 44 dynas.cm and subjected to vacuum metallization process in order to form a metal coating weight enough to provide a level of 2.0 Optical Density (OD). In order to check metal adhesion to the inventive film, the Inventive Example 1 was laminated to a standard BOPP film with a polyurethane based solvent less system provided by The Dow Chemical Company under commercial name of Morfree 970/CR 137. The adhesive layer applied has a weight of 2.0 g/cm$^2$. Laminate bond strength test was performed with films after 30 days of lamination process and are described in Table 5. Both films present bond strength higher than 50 gf/in, meeting most of market requirements, and no metal was removed from the inventive film surface, fact that demonstrated the high adhesion provided by the inventive film. The COF values where also measured and values were below 0.3 for the structure that used Inventive Film 1.

TABLE 5

| | mBOPP//BOPP (Comp. Ex. 1) | mDiam//BOPP (Inv. Ex. 1) |
|---|---|---|
| Laminate Bond Strenght (gf/in) | 81 | 70 |
| Failure Point | Cohesion Failure in the Adhesive | Adhesive Failure at BOPP interface so metal layer not removed. |
| COF internal/internal | 0.32 | 0.20 |

The present invention may be embodied in other forms without departing from the spirit and the essential attributes thereof, and, accordingly, reference should be made to the appended claims, rather than to the foregoing specification, as indicating the scope of the invention.

What is claimed is:

1. A multilayer metallized cast film comprising:
   a. a first layer (core) which comprises a polyethylene having a density greater than 0.94 g/cc and a melt index less than or equal to 1.3 g/10 min;
   b. a second layer having an interior surface and an exterior surface and which comprises a polyethylene having a density greater than 0.94 g/cc and a melt index in a range from 2.0 g/10 min to 4.01 g/10 min, wherein the exterior surface of the second layer faces away from the first layer, wherein the second layer further comprises a metal and/or metal oxide deposited on the exterior surface of the second layer, wherein the multilayer metallized cast film has a gloss of at least 70.6 as determined at a 45° angle according to ASTM D-2457.

2. The multilayer metallized cast film according to claim 1, further comprising a third layer which comprises a polyethylene having a melt index greater than or equal to 2 g/10 min and a density less than 0.94 g/cc, wherein the third layer is a second external layer of the film.

3. The multilayer metallized cast film according to claim1, wherein the film has a 2% MD modulus of greater than 400 MPa.

4. The multilayer metallized cast film according to claim 1, wherein the film has a thickness in a range from 14 microns to 100 microns.

5. The multilayer metallized cast film according to claim 1, wherein the film has an MD tear strength of less than 30 grams.

6. The multilayer metallized cast film according to claim 1, wherein the exterior surface of the second layer is surface treated and has a surface energy in the range of at least 38 dynes/cm.

7. The multilayer metallized cast film according to claim 1, wherein the film has an optical density from 0.1 to 3.

8. The multilayer metallized cast film according to claim 1, wherein the second layer has a coefficient of friction of less than 0.3.

9. The multilayer metallized cast film according to claim 2, wherein each the second and third layers comprise the same polyethylene.

10. The multilayer metallized cast film according claim 1, wherein the first layer comprises a linear polyethylene having a density greater than 0.95 g/cc.

11. The multilayer metallized cast film according to claim 1, wherein the polyethylene of the first layer has a melt index less than or equal to 1.0 g/10 min.

12. The multilayer metallized cast film according to claim 1, wherein the first layer further comprises less than 50% by weight of one or more additional polymers.

13. The multilayer metallized cast film of claim 12, wherein the one or more additional polymers is a low density polyethylene.

14. The multilayer metallized cast film according to claim 1, wherein the second layer is metallized with aluminum.

15. A packaging comprising the multilayer metallized cast film according to claim 1.

* * * * *